Oct. 28, 1941. L. F. BERHENKE ET AL 2,260,738
MANUFACTURE OF CRYSTALLINE GLYCOLLIC ACID
Filed Sept. 8, 1938
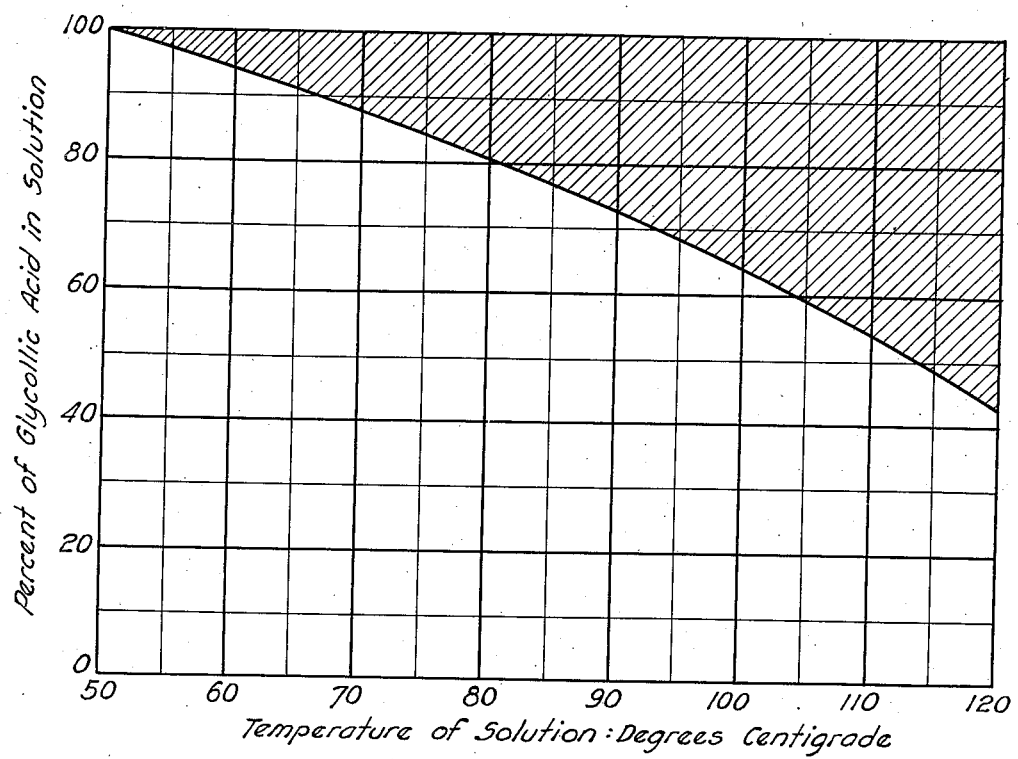
INVENTORS
Luther F. Berhenke
Russell B. DuVall
BY Griswold & Burdick
ATTORNEYS.

Patented Oct. 28, 1941

2,260,738

UNITED STATES PATENT OFFICE 2,260,738

MANUFACTURE OF CRYSTALLINE GLYCOLLIC ACID

Luther F. Berhenke and Russell B. Du Vall, Midland, Mich., assignors to The Dow Chemical Company, Midland, Mich., a corporation of Michigan Application September 8, 1938, Serial No. 228,903

9 Claims. (Cl. 260—535)

This invention concerns an improved method for manufacturing crystalline glycollic acid, particularly from aqueous glycollic acid solutions.

A number of methods for producing aqueous glycollic acid solutions are well known and it is also known that such solution may be evaporated under carefully controlled conditions to crystallize the acid. However, glycollic acid tends to dehydrate during the evaporation and form condensation products such as glycollid, glycollylglycollic acid, etc., which interfere with or prevent crystallization of the acid. The procedures heretofore recommended for evaporating aqueous glycollic acid to crystallize the latter are unduly time-consuming and require very careful control in order to obtain a satisfactory yield of the crystalline product. For instance, Witzeman, J. A. C. S. 39, 109–112 (1917), recommends that the aqueous glycollic acid solution be evaporated under vacuum on a water-bath until the water is largely, but not entirely removed. He points out that if the evaporation is not stopped at the correct point little, if any glycollic acid can be crystallized from the mixture. Grether et al., U. S. Patent No. 2,028,064, disclose that crystalline glycollic acid may be obtained by evaporating an aqueous glycollic acid solution under vacuum at a temperature below 60° C. and preferably below 40° C. This involves a slow evaporation under carefully controlled conditions and does not permit complete recovery of the acid.

In our research on the production of crystalline glycollic acid, we have found that even though the evaporation of an aqueous glycollic acid solution be carried out under the carefully controlled conditions recommended in the prior art, at least part of the acid undergoes dehydration with formation of condensation products which prevent complete crystallization of the available glycollic acid. However, we have also found that formation of the detrimental glycollic acid condensation products occurs principally during the latter stages of the evaporation, and that a dilute aqueous solution may safely be evaporated at atmospheric pressure as rapidly as desired, until the concentration of glycollic acid is 55 per cent by weight, after which the evaporation should be continued under vacuum while maintaining the residual mixture at temperatures which may gradually be reduced from 117° C. to 50° C. as the remaining water is removed. The accompanying drawing is a graph indicating the maximum temperatures to which the mixture may be heated during such latter stages of the evaporation to obtain a residue from which glycollic acid will crystallize satisfactorily. The ordinate and abscissa of the graph are the per cent by weight concentration of the glycollic acid and the temperatures to which it is heated during the final stages of evaporation, respectively. The shaded portion of the graph represents temperature—concentration conditions which should be avoided if a good crop of crystalline glycollic acid is to be obtained. The unshaded portion of the graph represents temperature—concentration conditions which may satisfactorily be maintained in the final stages of evaporation.

We have also found that the rate of final evaporation under vacuum may be increased by drawing fine bubbles of air, carbon dioxide, nitrogen, or other inert gas through the liquor. The gas may conveniently be admitted through a porous thimble or other means which will cause a dispersion of small bubbles in the liquor.

More important still we have found that after evaporating the solution and crystallizing glycollic acid from the residue, the mother liquor from the crystallization may be heated with water and again evaporated to obtain a second crop of crystalline glycollic acid, thereby permitting increased recovery of the acid in crystalline form. The glycollic acid condensation products, e. g. glycollid, glycollylglycollic acid, etc., formed during the initial evaporation, are hydrated to regenerate glycollic acid during the reheating with water, thus not only increasing the glycollic acid available for crystallization but also removing to considerable extent the condensation products which prevent complete crystallization of the acid.

In practicing the invention an aqueous glycollic acid solution from any suitable source is evaporated by heating at a pressure not greatly exceeding atmospheric pressure until the residual liquor contains not more than 55 per cent, preferably 40 per cent or less, by weight of glycollic acid. The evaporation is thereafter continued under sufficient vacuum so that the temperature to which the mixture is heated during the subsequent stages of the evaporation falls within the unshaded area on the graph in the accompanying drawing. In practice it is well to maintain the temperatures at least 10° C. below the maximum temperatures indicated as satisfactory in the drawing, so as to avoid possibility of local overheating with resultant excessive formation of glycollic acid condensation products. The evaporation is preferably, though not necessarily, completed at a temperature not exceeding 40° C. and an absolute pressure not greater than 13 millimeters. As hereinbefore pointed out, the rate of evaporation may be increased by passing air or other inert gas through the heated mixture. This is particularly advantageous during the final stages of evaporation under reduced pressure at only moderately elevated temperatures.

The evaporation is usually continued until the mixture retains from 5 to 30 per cent, preferably between 10 and 20 per cent, by weight of water and may, though not conveniently, be continued to dryness. Crystallization usually occurs during the final stages of evaporation, but in order to complete the crystallization the residue is cooled to room temperature or below.

The crystalline product is separated, e. g. by filtration, decantation or centrifuging, and preferably is washed free of adhering mother liquor with a small portion of acetone, methyl ethyl ketone, or other solvent and dried. The yield of crystalline glycollic acid obtained at this stage in the process is dependent both on the temperature at which the evaporation has been carried out and the completeness of the evaporation. By carrying the evaporation out under the temperature conditions above recommended and continuing it until nearly all water has been removed, it is possible to obtain a 95 per cent yield of crystalline glycollic acid in this first stage of the process. However, in commercial practice, such accurate temperature control and complete evaporation may involve tedious and difficult operation and are not required. According to the invention, the evaporation may be carried out under any conditions which will permit crystallization of glycollic acid from the residue. Glycollic acid potentially available, but not recovered as the crystalline compound in this first stage of the invention, may be recovered in the subsequent stages described below.

The mother liquor from the crystallization is a mixture of uncrystallized glycollic acid and glycollic acid condensation products, e. g. glycollid, glycollylglycollic acid, etc. It is combined with the washings from the crystalline material and water is added in amount representing about twice or more the weight of the mother liquor, preferably from 1.8 to 4 times the weight of mother liquor. The resultant mixture is heated to a hydrolyzing temperature at atmospheric or increased pressure. The temperature and time of heating may be varied widely. However, the hydrolysis may be accomplished by boiling the mixture under reflux for two hours or longer, or it may be accomplished in shorter time by heating the mixture under pressure in a bomb or autoclave at a temperature of 120°–130° C. Still higher temperatures, e. g. 150° C., can be used, but the temperature should, of course, be below that at which the glycollic acid is decomposed.

The hydrolyzed mixture is then evaporated alone, or together with a fresh batch of aqueous glycollic acid to remove the water and the glycollic acid is crystallized as hereinbefore described.

By operating as just described, glycollic acid may be crystallized from aqueous solutions and the crystalline product recovered in nearly theoretical yield.

The following examples illustrate certain ways in which the principle of the invention may be applied, but are not to be construed as limiting the invention.

*Example 1*

An aqueous glycollic acid solution weighing 2657 grams and containing 800 grams of dissolved glycollic acid was prepared by hydrolysis of chloro-acetic acid and removal of inorganic chlorides from the product in accordance with the method given in U. S. Patent No. 2,028,064. This aqueous solution was evaporated by warming and drawing fine bubbles of air through the same while under vacuum. The evaporation was continued, with gradual reduction of the pressure, until a heavy crop of crystals was obtained, at which time the mixture was under 5 millimeters absolute pressure. The crystals were separated by filtration and washed with a small portion of acetone. There was obtained 441 grams of pure crystalline glycollic acid. The mother liquor from the crystallization was a viscous syrup-like liquid. To it were added approximately twice its weight of water and the acetone used in washing the crystalline material. The resultant mixture was boiled under reflux at atmospheric pressure for 3 hours and then evaporated until considerable crystallization occurred and the crystals were separated as just described. This second crystalline crop consisted of 205 grams of pure glycollic acid. The syrup-like mother liquor from the second crystallization was boiled for 3 hours with 2 parts by weight of water, after which the solution was evaporated to crystallization and the crystalline product was separated as above described. As this third crop, there was obtained 144.7 grams of crystalline glycollic acid, thus bringing the over-all yield of the crystalline acid to 790.7 grams, or 99 per cent of the acid theoretically recoverable from the initial glycollic acid solution. The mother liquor from this last crystallization was too slight to warrant further working.

*Example 2*

127.2 grams of glycollid and possibly other anhydrides of glycollic acid which had been prepared by heating 150 grams of pure crystalline glycollic acid sufficiently to dehydrate and drive water therefrom, was treated with 302 grams of water and the mixture was boiled under reflux for 3 hours. The solution was then evaporated under vacuum at temperatures not exceeding 36° C. until crystallization of glycollic acid occurred. The crystals were separated and the mother liquor was further evaporated to obtain a second crop of crystals. These crystals were removed and the mother liquor was still further evaporated to obtain a third crop of crystals. The over-all recovery of crystalline glycollic acid was 142.5 grams or 95 per cent of theoretical.

It will be apparent that the aqueous glycollic acid solution from which glycollic acid is to be crystallized according to the invention need not be strictly pure, but may contain other components such as soluble mineral acids, salts, ketones or other substances which are non-reactive with the glycollic acid and do not crystallize with or prevent crystallization of the latter.

Other modes of applying the principle of the invention may be employed instead of those explained, change being made as regards the method herein described, provided the step or steps specified by any of the following claims or the equivalent of such stated step or steps be employed.

We therefore particularly point out and distinctly claim as our invention:

1. In a method for the manufacture of crystalline glycollic acid, the steps which consist in evaporating an aqueous glycollic acid solution to crystallize glycollic acid therefrom, separating the glycollic acid, heating the mother liquor from the crystallization with at least 1.8 times its weight of water to again form an aqueous glycollic acid solution, and evaporating the latter to crystallize additional glycollic acid.

2. In a method for the manufacture of crystalline glycollic acid the step which consists in evaporating an aqueous glycollic acid solution at a pressure not greatly exceeding atmospheric pressure until the residual solution contains not more than 55 per cent by weight of glycollic acid and thereafter continuing the evaporation under vacuum until crystallization occurs, the pressure on the system in the final stages of the evaporation being such that the temperature does not exceed 50° C.

3. In a method for the manufacture of crystalline glycollic acid, the step which consists in evaporating an aqueous glycollic acid solution under vacuum while passing an inert gas through the same, and continuing the evaporation until glycollic acid crystallizes from the residual mixture.

4. In a method for the manufacture of crystalline glycollic acid, the step which consists in evaporating an aqueous glycollic acid solution under vacuum at a temperature not exceeding 50° C. while passing an inert gas through the mixture, and continuing the evaporation until crystallization occurs.

5. In a method for the manufacture of crystalline glycollic acid, the steps which consist in evaporating an aqueous glycollic acid solution at a pressure not greatly exceeding atmospheric pressure until the residual solution contains not more than 55 per cent by weight of glycollic acid, thereafter continuing the evaporation under vacuum, the pressure on the system in the final stages of the evaporation being such that the temperature does not exceed 50° C., cooling the evaporated mixture to crystallize glycollic acid therefrom, and separating the crystalline product.

6. In a method for the manufacture of crystalline glycollic acid, the steps which consist in evaporating an aqueous glycollic acid solution at a pressure not greatly exceeding atmospheric pressure until the residual solution contains not more than 55 per cent by weight of glycollic acid, thereafter continuing the evaporation under vacuum, the pressure on the system in the final stages of the evaporation being such that the temperature does not exceed 50° C., cooling the evaporated mixture to crystallize glycollic acid therefrom, removing the crystalline glycollic acid product, heating the mother liquor from the crystallization with at least 1.8 times its weight of water to hydrolyze glycollic acid condensation products therein and form additional glycollic acid, and evaporating the resultant solution as above specified to crystallize glycollic acid therefrom.

7. In a method for the manufacture of crystalline glycollic acid, the steps which consist in evaporating an aqueous glycollic acid solution at a pressure not greatly exceeding atmospheric pressure until the residual solution contains not more than 55 per cent by weight of glycollic acid, thereafter continuing the evaporation under vacuum while passing an inert gas through the mixture, the pressure on the system in the final stages of the evaporation being such that the temperature does not exceed 50° C., cooling the evaporated mixture to crystallize glycollic acid therefrom, and separating the crystalline product.

8. In a method for the manufacture of crystalline glycollic acid, the steps which consist in evaporating an aqueous glycollic acid solution at a pressure not greatly exceeding atmospheric pressure until the residual solution contains not more than 55 per cent by weight of glycollic acid, thereafter continuing the evaporation under vacuum while passing an inert gas through the mixture, the pressure on the system in the final stages of the evaporation being such that the temperature does not exceed 50° C., cooling the evaporated mixture, crystallizing glycollic acid therefrom, separating the crystalline product, heating the mother liquor with at least 1.8 times its weight of water to hydrolyze glycollic acid condensation products therein and form additional glycollic acid, evaporating the resultant solution as above specified to crystallize glycollic acid therefrom, and separating the crystalline product.

9. In a method of producing crystalline glycollic acid from aqueous glycollic acid solutions, the steps which consist in heating a noncrystalline mixture of glycollic acid and glycollic acid condensation product with at least 1.8 times its weight of water, whereby the glycollic acid condensation product is hydrolyzed to form additional glycollic acid and evaporating the resultant solution to crystallize the glycollic acid.

LUTHER F. BERHENKE.
RUSSELL B. DU VALL.